UNITED STATES PATENT OFFICE.

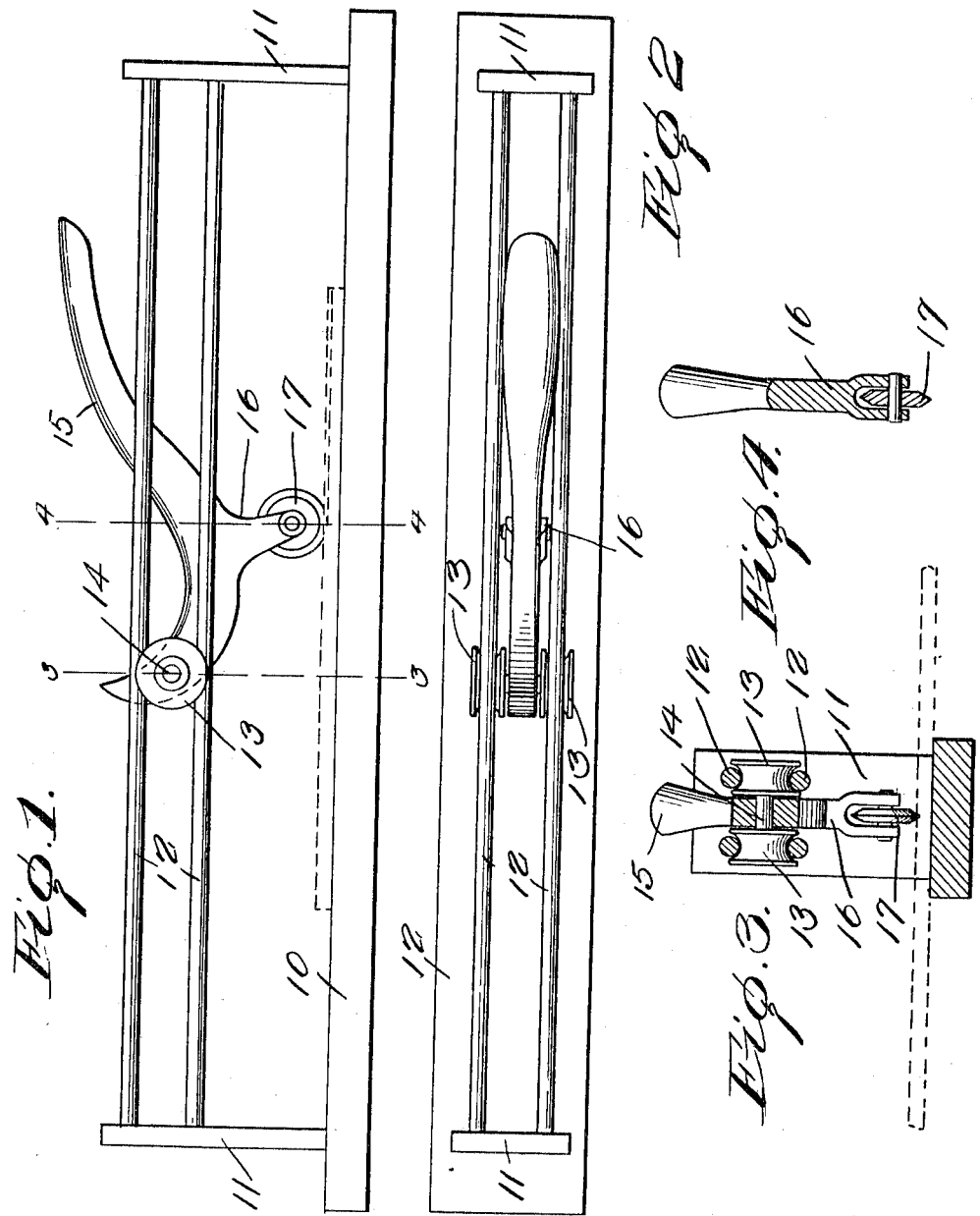

JOHN D. KIZER, OF SCRANTON, PENNSYLVANIA.

SHINGLE-CUTTER.

1,106,224.　　　Specification of Letters Patent.　　Patented Aug. 4, 1914.

Application filed September 22, 1913. Serial No. 791,163.

*To all whom it may concern:*

Be it known that I, JOHN D. KIZER, a citizen of the United States, residing at Scranton, in the county of Lackawanna, State of Pennsylvania, have invented certain new and useful Improvements in Shingle-Cutters; and I do hereby declare the following to be a full, clear, and exact description of the invention, such as will enable others skilled in the art to which it appertains to make and use the same.

This invention relates to improvements in cutting machines and particularly to machines for cutting slate or asbestos shingles.

The principal object of the invention is to provide a simple device of this character which is easy of operation and effective for cutting either slate or asbestos shingles.

Other objects and advantages will be apparent from the following description, when taken in connection with the accompanying drawings.

In the drawings: Figure 1 is a side elevation of my improved shingle cutter. Fig. 2 is a top plan view. Fig. 3 is a vertical transverse sectional view on the line 3—3 of Fig. 1. Fig. 4 is a vertical transverse sectional view on the line 4—4 of Fig. 1.

Referring particularly to the accompanying drawings, 10 represents a suitable base near the extremities of which are suitably mounted the vertical uprights 11. Secured to the upper portions of these uprights, and extending therebetween are the four parallel rods 12, one pair of which is disposed in a plane above the other pair. A pair of grooved rollers 13 are so disposed between the rods that one of the upper rods engages a groove of the other wheel from above, while the lower rod engages the wheel below. These grooved wheels 13 are mounted on the ends of a short shaft 14 extending transversely of the device, and pivotally mounted on this shaft, and between the rollers is a lever 15. Formed on the lever and depending therefrom slightly in rear of the pivot point thereof is a fork 16, and mounted in the lower end of the fork and rotating therein is a cutting reel 17.

In the operation of the device, the shingle to be cut is placed on the base 10 under the rods 12, and then the handle lever 15 is grasped and the carriage including the rollers 13 and shaft 14 moved longitudinally along the rods 12, downward pressure being exerted on the handle to engage the cutting wheel 17 with the shingle.

While I have shown the rods 12 circular in cross section, I wish it understood that these rods may be made to have cross sectional design either rectangular, triangular or any shape desired.

From the foregoing it will readily be seen that I have provided a simple and comparatively cheap structure and one in which the proper pressure can be exerted to cut the shingle both in the forward and backward movement of the carriage.

What is claimed is:—

In a shingle cutting device, a suitable base, vertical supports on the opposite ends of the base, a plurality of rods secured to the supports and extending therebetween, said rods being arranged in superimposed pairs, grooved rollers disposed vertically in parallel relation with each other, each roller receiving respectively an upper and lower rod in its groove, a transverse shaft on which the rollers are mounted, a lever pivotally carried by the shaft between the rollers and a rotating cutting wheel carried by the lever and depending therebelow in rear of the pivot of the lever.

In testimony whereof, I affix my signature in the presence of two witnesses.

JOHN D. KIZER.

Witnesses:
A. ALLEN WOODRUFF,
WM. C. HENNESIGWORTH.

---

Copies of this patent may be obtained for five cents each, by addressing the "Commissioner of Patents, Washington, D. C."